Jan. 15, 1957  H. W. TANIS  2,777,521
SHEET SLITTING MACHINE
Filed Feb. 16, 1955  3 Sheets-Sheet 2

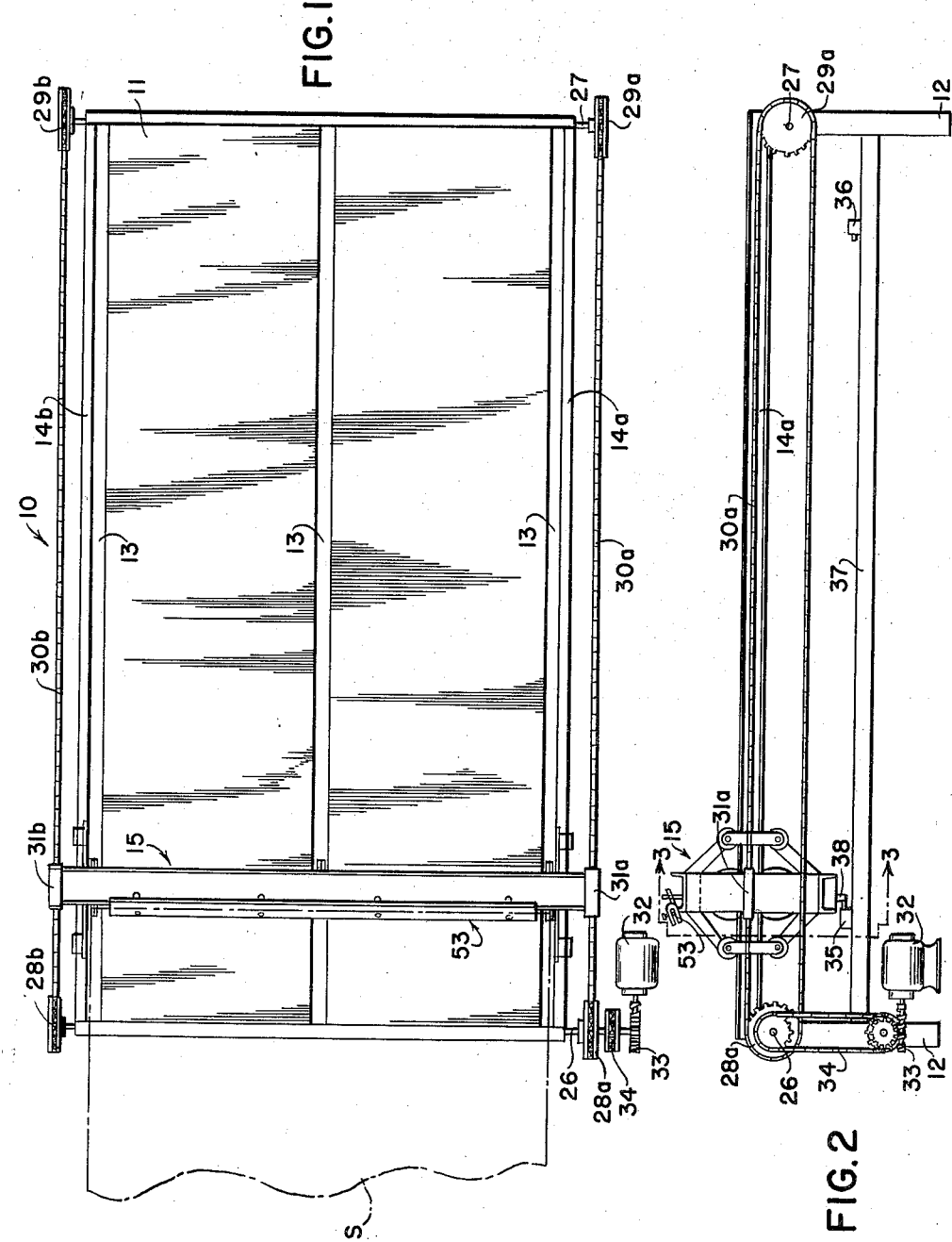

United States Patent Office 2,777,521
Patented Jan. 15, 1957

2,777,521

SHEET SLITTING MACHINE

Henry W. Tanis, Hatfield, Pa., assignor to Greene, Tweed & Co., North Wales, Pa.

Application February 16, 1955, Serial No. 488,651

12 Claims. (Cl. 164—76)

The present invention relates generally to the slitting or longitudinal cutting of sheet material, and more particularly is directed to a machine for slitting sheet material fed thereto from a conventional sheeting machine or the like.

An object of the invention is to provide a sheet slitting machine capable of accurately and conveniently slitting sheet material fed thereto.

Another object is to provide a sheet slitting machine including a table for supporting the sheet material during the slitting thereof, and a carriage reciprocable along the table and carrying cutters which are actuated in response to the movement of the carriage relative to the table, whereby a single power source for reciprocating the carriage also effects the actuation of the cutters.

Another object is to provide a sheet slitting machine of the described character, wherein a sheet lying on the table is longitudinally slit by the cutters during the movement of the carriage in one direction and, during the movement of the carriage in the opposite direction, a clamp on the carriage can be attached to the leading edge of the sheet material supplied to the slitting machine, for example, from a conventional sheeting machine, in order to draw a length of the sheet material onto the table for subsequent slitting when the carriage is again displaced in the first mentioned direction.

In accordance with this invention, the foregoing, and other objects, features and advantages are achieved by providing a sheet slitting machine including a horizontal table having rails extending along its opposite longitudinal edges, and a carriage extending laterally across the table and supported movably on the rails for reciprocating movement in the longitudinal direction of the table. The carriage is driven at its opposite ends by a drive arrangement, which may, for example, be powered by a single reversible electric motor under the control of an operator, so that the carriage can be displaced along the table from an initial position, disposed adjacent one end of the latter, to a rest position adjacent the other end of the table to effect the drawing of a length of sheet material onto the table during such displacement. When the electric motor is reversed, the carriage travels back to its initial position and, during such travel of the carriage, cooperating rotary shearing discs or cutters carried by the carriage are actuated to slit the sheet material, previously laid on the table, along related longitudinal lines. The actuation of the cutters in response to the movement of the carriage relative to the table is effected by a pinion or spur gear on the carriage meshing with a fixed gear rack on the table and driving the shafts carrying the rotatable cutters through a suitable gear transmission.

In order that the invention may be fully understood, an illustrative embodiment thereof is hereinafter described in detail and shown in the accompanying drawings, which form a part hereof, and wherein:

Fig. 1 is a top plan view of a sheet slitting machine constructed in accordance with the present invention;

Fig. 2 is a side elevational view of the machine of Fig. 1;

Figure 3:
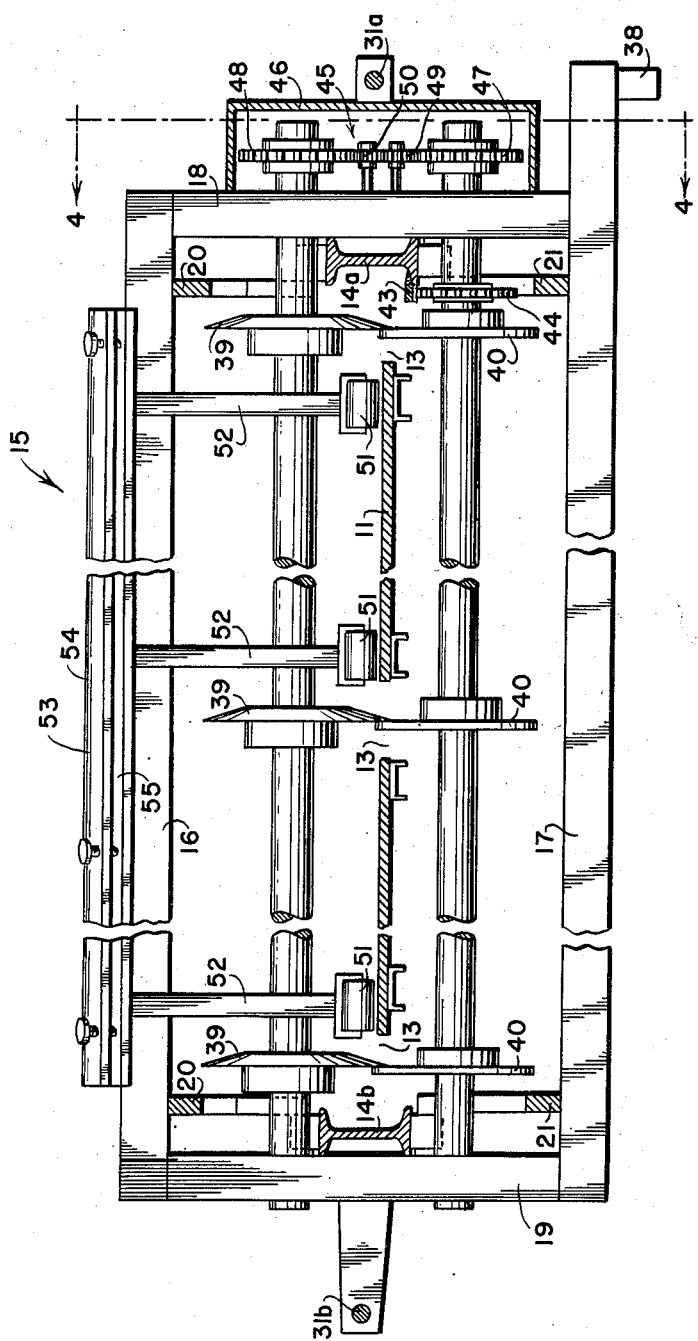
Fig. 3 is a transverse sectional view taken along the line 3—3 of Fig. 2, but on an enlarged scale.

Referring to the drawings in detail, and initially to Figs. 1 and 2 thereof, a sheet slitting machine embodying the present invention is there illustrated and generally identified by the reference numeral 10. The machine 10 includes a table 11 which is supported in a horizontal plane by suitable legs 12 (Fig. 2) and has longitudinal slots 13 formed therein at the locations where sheet material laid upon the table is to be slit.

Rails 14a and 14b, which may be in the form of I-beams, as shown on Fig. 3, extend along the opposite longitudinal edges of the table 11, and movably support a carriage, generally identified by the reference numeral 15, which is reciprocable in the longitudinal direction of the table.

The carriage 15 includes a frame made-up of laterally extending, parallel frame members 16 and 17 disposed above and below, respectively, the table 11, and secured together, at their opposite ends, by vertical frame members 18 and 19 (Fig. 3) which are disposed laterally outside of the rails 14a and 14b, respectively. The frame of carriage 15 further includes upper and lower yoke members 20 and 21, respectively, extending longitudinally adjacent the opposite ends of the frame members 16 and 17, and the yoke members 20 and 21, at their opposite ends, rotatably carry rollers 22 and 23, respectively, which are in rolling contact with the upper and lower surfaces, respectively, of the adjacent rails 14a and 14b and thereby support the carriage 15 on such rails for longitudinal movement with respect to the table 11, while preventing vertical displacement of the carriage. The rigidity of the carriage frame is further increased by spanners 24 and 25 (Fig. 4) which connect the axes of rotation of the rollers 22 and 23 and thereby prevent spreading apart of the yokes 20 and 21.

In order to effect the reciprocation of carriage 15 in the longitudinal direction of table 11, laterally extending shafts 26 and 27 are rotatably mounted below the opposite ends of the table, and the shaft 26 and 27 have sprocket wheels 28a and 28b and sprocket wheels 29a and 29b, respectively, mounted thereon adjacent their opposite ends (Fig. 1). Chains 30a and 30b run around the sprocket wheels 28a and 29a and the sprocket wheels 28b and 29b, respectively, and the ends of such chains, for example, in their upper runs, are secured to the frame of carriage 15, as at 31a and 31b. The shaft 26 is rotationally driven, for example, by a conventional reversible electric motor 32 under the control of an operator, the power of the motor 32 being transmitted to the shaft 26 by a reducing worm drive 33 and a chain and sprocket transmission 34 (Figs. 1 and 2). Thus, when the motor 32 is operated in the direction causing clockwise rotation of shaft 26, the carriage 15 is displaced to the right along table 11, as viewed in Fig. 2, and, when the motor is operated in the opposite direction, the carriage is displaced to the left. If desired, limit switches 35 and 36 (Fig. 2) may be provided on a frame member 37 below the table 11 for engagement by an abutment 38 (Figs. 2 and 3) depending from the frame of carriage 15 when the latter nears the end of its travel in one or the other of the longitudinal directions. The limit switches 35 and 36 are, as is usual, interposed in the energizing circuit (not shown) of the reversible motor 32 to automatically deenergize the latter and halt the carriage as the latter reaches the end of its related stroke. Thus, it is only necessary for the operator to start the movement of the carriage 15 in one or the other of the longitudinal directions, and the limit switches then automatically terminate such movements to prevent over-riding of the carriage.

In order to effect slitting of a length of sheet material laid upon the table 11, the carriage 15 further includes pairs of cooperating rotary shearing discs or cutters 39 and 40 extending through the slots 13 of the table from above and below the latter, respectively. The cutters 39 are mounted at suitably spaced apart locations on an upper shaft 41 which is journalled, at its opposite end portions, in the vertical frame members 18 and 19 (Fig. 3), and the cutters 40 are mounted on a lower shaft 42, which is also journalled at its opposite ends in the frame members 18 and 19, at locations disposing the cutters 40 in shearing relationship to the paired cutters 39. When the carriage 15 is displaced longitudinally along the table 11 and the cutters 39 and 40 are rotated, a length of sheet material laid upon the table is slit along lines determined by the lateral positions of the paired cutters 39 and 40. It is apparent that the locations of the longitudinal lines along which the sheet material is to be slit can be varied merely by changing the locations of the cutters 39 and 40 on the related shafts 41 and 42 and of the slots 13 in the table.

As is apparent in Fig. 3, the contacting radial surfaces of the rotary cutters 39 and 40, which define the line along which the sheet material is slit or sheared, are flat, and only the cutter 39 of each pair tapers in its radially outward portion to define a thin or sharp peripheral cutting edge.

In order to permit the operation of the machine 10 from a single source of power, for example, the reversible electric motor 32, the shafts 41 and 42, and hence the cutters 39 and 40, are rotated in response to movement of the carriage 15 along the table 11. For this purpose, a fixed gear rack 43 extends along the lower flange of one of the rails 14a and 14b, for example, along the rail 14a, as shown in the drawings (Figs. 3 and 4), and meshes with a pinion or spur gear 44 mounted at a suitable location on the lower shaft 42. Thus, as the carriage 15 is longitudinally displaced, the gear 44 and shaft 42 are rotated to effect corresponding rotation of the lower cutters 40. In order to transmit the rotation of shaft 42 to shaft 41, and hence to the upper cutters 39, a gear transmission, generally identified by the reference numeral 45, is interposed between the shafts 41 and 42 and may be enclosed by a casing 46 on the outside of frame member 18. The gear transmission 45 includes spur gears 47 and 48 secured to the ends of shafts 42 and 41, respectively, and meshing idler gears 49 and 50 mounted on stub shafts suitably carried by frame member 18 and respectively meshing with the gears 47 and 48, whereby the shaft 41 and cutters 39 thereon are rotated in the direction opposite to the rotation of the shaft 42 and the cutters 40 on the latter, with the peripheral portions of the cutters 39 and 40 which extend into the slots 13 moving in the direction opposed to the movement of the carriage 15 relative to table 11.

In order to hold the sheet material flat on the table 11 during the slitting thereof, the carriage 15 is provided with hold down rollers 51 which are rotatably supported by brackets 52 (Figs. 3 and 4) depending from frame member 16 at locations as close as possible to the rotary cutters 39 and 40.

Figure 4:
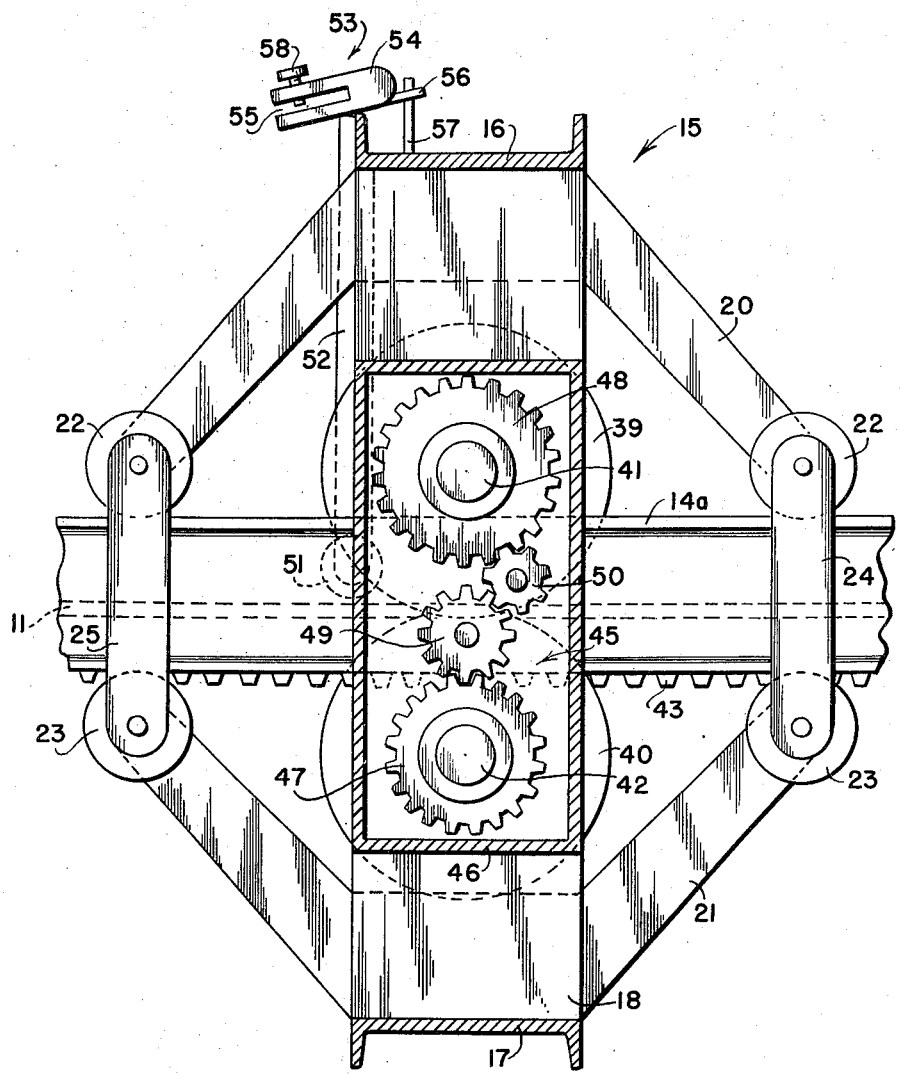
Fig. 4 is a sectional view taken along the line 4—4 of Fig. 3.

Finally, the carriage 15 also has a clamp, generally identified by the reference numeral 53, removably mounted thereon for use in drawing a length of sheet material onto the table 11 in a manner hereinafter described in detail. The clamp 53 preferably is in the form of an elongated bar 54 having a slot 55 along the length thereof, which opens at one longitudinal edge of the bar, and apertured lugs 56 extending from the other longitudinal edge to removably engage over pins 57 extending from frame member 16 (Fig. 4). Securing members, such as, thumb screws 58, extend into the slot 55 to removably secure the leading edge of a web or the like of sheet material in the slot.

The above described sheet slitting machine 10 is conveniently arranged at the discharge end of a conventional sheeting machine (not shown) to effect longitudinal slitting of the sheet material discharged from the latter. In Fig. 1 and Fig. 2 of the drawings, it is assumed that the sheet material S, shown in broken lines on Fig. 2, is fed to the machine 10 from a source of the sheet material located at the left-hand end of the table 11.

The operation of the sheet slitting machine 10 is as follows:

The carriage 15 is initially disposed adjacent the left-hand end of the table 11 (Figs. 1 and 2), that is, at the end of the table adjacent the source of sheet material, and the leading edge of the sheet material is secured in the clamp 53. When the reversible electric motor 32 is operated in the direction causing travel of carriage 15 toward the right, the sheet material is drawn by the carriage onto the table 11. As the carriage nears the end of the table remote from the source of sheet material, further movement of the carriage is prevented, either by the operator or the limit switch 36, and, at the same time, the discharging of sheet material from the source of the latter, for example, a sheeting machine, is also interrupted. Then, the clamp 53 is released permitting the leading edge of the sheet material to fall onto the table 11. When the motor 32 is again operated, but in the direction causing return of the carriage 15 to the right to its original position (Figs. 1 and 2), the rotary cutters slit the length of sheet material lying on the table 11. In order to permit removal of the slit length of sheet material from the table, the sheet material is cut laterally, for example, manually, at a location adjacent the left-hand end of the table. Following removal of the slit length of sheet material from the table, the latter is again clear, and the leading edge of the sheet material fed to the machine 10 can be secured to the clamp 53 preparatory to repeating the cycle of operations described above.

From the foregoing, it is apparent that this invention provides a machine capable of accurately and conveniently slitting sheet material, and wherein the rotary cutters are driven in response to movements of the reciprocated carriage, with the stroke of the latter in one direction serving to draw a length of sheet material onto the table, and the stroke of the carriage in the opposite direction effecting the longitudinal slitting of the sheet material on the table, thereby to avoid any unnecessary or waste motion of the carriage.

Although a particular embodiment of the invention has been described in detail and shown in the drawings for illustrative purposes, it is to be understood that the invention is not limited to the particular embodiment, and that various changes and modifications may be effected in the latter without departing from the scope or spirit of the invention as defined in the appended claims.

What is claimed is:

1. A sheet slitting machine comprising a horizontal table adapted to support a length of sheet material laid thereon, a carriage, means supporting said carriage for reciprocating movement relative to said table in the longitudinal direction of the latter, means associated with said carriage for grasping one edge of the sheet material to a draw a length thereof onto said table during the movement of said carriage in one direction away from one end of the table, rotary cutting means mounted on said carriage and operative to slit sheet material on said table as the carriage is displaced relative to the table, means for reciprocating said carriage relative to said table, and means effecting operation of said rotary cutting means in response to the displacement of said carriage relative to said table.

2. A sheet slitting machine comprising a horizontal table adapted to receive sheet material from a source thereof adjacent one end of the table, a carriage, means supporting said carriage for reciprocating movement relative to said table in the longitudinal direction of the latter, releasable clamping means on said carriage for grasping the leading edge of the sheet material to draw a length of the latter onto said table during the movement of said carriage from an initial position, adjacent said one end of the table, toward the other end of the table, rotary cutting means mounted on said carriage and effective to slit a length of sheet material laid upon said table during the return movement of said carriage back to said initial position, and means for moving said carriage along said table between the opposite ends of the latter.

3. A sheet slitting machine comprising a horizontal table adapted to receive sheet material from a source thereof adjacent one end of the table, a carriage, means supporting said carriage for reciprocating movement relative to said table in the longitudinal direction of the latter, releasable clamping means on said carriage for grasping the leading edge of the sheet material to draw a length of the latter onto said table during the movement of said carriage from an initial position, adjacent said one end of the table, toward the other end of the table, rotary cutting means mounted on said carriage and operative, during the return movement of the carriage back to said initial position, to longitudinally slit sheet material previously laid on said table, means for effecting to-and-fro movement of said carriage relative to said table between the opposite ends of the latter, and means operating said rotary cutting means in response to said movement of the carriage relative to the table.

4. A sheet slitting machine comprising a horizontal table adapted to receive sheet material from a source of the latter adjacent one end of the table and having at least one longitudinal slot, a carriage, means supporting said carriage for reciprocating movement longitudinally of said table, releasable clamping means associated with said carriage for grasping an edge of the sheet material to draw a length thereof onto the table during the movement of the carriage in one direction away from said one end of the table, a pair of upper and lower rotary cutters carried by said carriage and associated with each slot of said table to extend into the related slot from above and below said table, respectively, means for effecting the reciprocating movement of said carriage to and from said one end of the table, and means for rotating each pair of rotary cutters so that the latter cooperate to slit sheet material on said table along the related slot.

5. A sheet slitting machine comprising a horizontal table adapted to receive sheet material from a source of the latter adjacent one end of the table and having at least one longitudinal slot, a carriage, means supporting said carriage for reciprocating movement longitudinally of said table, releasable clamping means associated with said carriage for grasping a predetermined edge of the sheet material to draw a length thereof onto said table during movement of said carriage in one direction away from said one end of the table, a pair of upper and lower rotary cutters carried by said carriage and associated with each slot of said table to extend into the related slot from above and below said table, respectively, means for effecting the reciprocating movement of said carriage to and from said one end of the table, and means rotating each pair of rotary cutters in response to the reciprocating movement of said carriage so that the cutters cooperate with each other to slit sheet material supported on said table along the related slot in the latter.

6. A sheet slitting machine comprising a horizontal table adapted to receive sheet material from a source of the latter adjacent one end of the table and having at least one longitudinal slot, a carriage, means supporting said carriage for reciprocating movement longitudinally of said table, releasable clamping means on said carriage for grasping the leading edge of the sheet material to draw a length of the latter onto said table during the movement of said carriage in one direction away from said one end of the table, a pair of cooperating upper and lower rotary cutters associated with each slot of the table and rotatably carried by said carriage to extend into the related slot from above and below the table, respectively, means for effecting the movement of said carriage in said one direction away from said one end of the table and then in the opposed direction toward said one end of the table following the release of said clamping means, and means rotating each pair of rotary cutters in response to the movement of said carriage relative to said table so that the related cutters of each pair cooperate to slit sheet material on said table along the related slot.

7. A sheet slitting machine according to claim 6; wherein said means supporting the carriage includes rails extending along the opposite longitudinal edges of said table, and guide rollers on said carriage in rolling contact with said rails from above and below the latter to prevent vertical movement of said carriage with respect to said table.

8. A sheet slitting machine according to claim 6; wherein said means for effecting the movement of said carriage relative to said table includes laterally extending rotatable shafts adjacent the opposite ends of said table, sprocket wheels on the opposite ends of each of said shafts, chains extending around the sprocket wheels on said shafts which are disposed at the same sides of said table, means securing said chains to the adjacent ends of said carriage, a reversible electric motor, and means transmitting the rotation of said motor to one of said shafts so that said chains are simultaneously driven and, in turn, propel said carriage.

9. A sheet slitting machine according to claim 8; further comprising limit switch means fixed relative to said table, and an abutment on said carriage engageable with said limit switch means to halt the operation of said reversible electric motor as the carriage nears an end of the table during its reciprocating movement.

10. A sheet slitting machine according to claim 6; further comprising hold down rollers on said carriage engageable with sheet material on said table from above in the proximity of each slot, thereby to hold the sheet material flat during the slitting thereof.

11. A sheet slitting machine according to claim 6; wherein said upper and lower rotary cutters are respectively mounted on upper and lower shafts journalled in said carriage, and said means rotating the cutters includes a gear rack fixed relative to said table, a pinion on one of said shafts meshing with said gear rack to rotate said one shaft as said carriage is moved relative to said table, and a gear transmission means between said shafts operative to rotate the other of said shafts in the direction counter to the rotation of said one shaft.

12. A sheet slitting machine according to claim 11; wherein said gear rack is disposed below said table and is engaged from below by said pinion so that the portions of said cutters extending into the related slot move in the direction opposed to the movement of said carriage relative to the table.

References Cited in the file of this patent

UNITED STATES PATENTS

| | | |
|---|---|---|
| 985,446 | Pease | Feb. 28, 1911 |
| 1,076,772 | Lilleberg | Oct. 28, 1913 |
| 1,352,240 | Baldwin | Sept. 7, 1920 |
| 1,598,381 | Makowski | Aug. 31, 1926 |
| 1,732,781 | Tiffany | Oct. 22, 1929 |
| 1,821,409 | Stone | Sept. 1, 1931 |
| 2,210,136 | Vanstory | Aug. 6, 1940 |